United States Patent
Richley et al.

(10) Patent No.: US 6,184,789 B1
(45) Date of Patent: Feb. 6, 2001

(54) METHOD AND APPARATUS FOR VISUALLY DETERMINING OBJECT LOCATION

(75) Inventors: Edward A. Richley, Palo Alto; Mark D. Weiser, deceased, late of Palo Alto, by Victoria Ann Reich, legal representative; Alexander E. Silverman, Menlo Park; Matthew E. Howard, San Francisco; Bryan T. Preas, Palo Alto, all of CA (US)

(73) Assignee: Xerox Corporation, Stamford, CT (US)

( * ) Notice: Under 35 U.S.C. 154(b), the term of this patent shall be extended for 0 days.

(21) Appl. No.: 09/337,659

(22) Filed: Jun. 22, 1999

(51) Int. Cl.$^7$ ................................................ G08B 13/14
(52) U.S. Cl. .................. 340/571; 340/691.1; 340/693.4; 340/825.49
(58) Field of Search ............................ 340/568.1, 571, 340/572.1, 691.1, 691.7, 505, 10.1, 825.34, 693.1, 693.4, 825.49, 691.2, 691.6

(56) References Cited

U.S. PATENT DOCUMENTS

| | | |
|---|---|---|
| 2,354,018 | 7/1944 | Heltzer et al. .......................... 359/538 |
| 2,354,048 | 7/1944 | Palmquist ......................... 359/538 X |
| 3,915,771 | 10/1975 | Gatzke et al. ..................... 359/540 X |
| 4,117,192 | 9/1978 | Jorgensen ......................... 359/540 X |
| 4,126,854 | 11/1978 | Sheridon ........................... 359/296 X |
| 4,143,103 | 3/1979 | Sheridon ................................... 264/4 |
| 4,234,869 * | 11/1980 | Sandelman ................... 340/825.49 X |
| 4,261,653 | 4/1981 | Goodrich .............................. 359/296 |
| 4,376,936 * | 3/1983 | Kott ................................... 340/825.3 |
| 4,507,653 * | 3/1985 | Bayer ................................ 340/571 X |
| 4,688,900 | 8/1987 | Doane et al. ............................ 349/87 |
| 4,814,742 * | 3/1989 | Morita et al. ............... 340/825.49 X |
| 4,948,232 | 8/1990 | Lang ..................................... 349/142 |
| 4,994,204 | 2/1991 | Doane et al. ..................... 349/183 X |
| 5,063,380 * | 11/1991 | Wakura ................................ 340/10.1 |
| 5,155,607 | 10/1992 | Inoue et al. ............................. 349/89 |
| 5,251,048 | 10/1993 | Doane et al. ........................... 345/87 |
| 5,469,020 | 11/1995 | Herrick ................................. 313/511 |
| 5,497,149 * | 3/1996 | Fast ...................................... 340/988 |
| 5,505,473 * | 4/1996 | Radcliffe ..................... 340/825.49 X |
| 5,677,673 * | 10/1997 | Kipnis ............................. 340/571 X |
| 5,680,105 * | 10/1997 | Hedrick ................................ 340/571 |
| 5,767,532 * | 6/1998 | Nishiguchi et al. ........ 340/825.49 X |
| 5,767,952 * | 6/1998 | Ohtomo et al. ..................... 356/4.01 |
| 5,963,134 * | 10/1999 | Bowers et al. ..................... 340/572.1 |

FOREIGN PATENT DOCUMENTS 57998    5/1978   (JP) .

OTHER PUBLICATIONS

R. Micheletto et al., "A Simple Method for the Production of a Two–Dimensional, ordered Array of Small Latex Particles", *Langmuir*, vol. 11, No. 9, May, 1995, pp. 3333–3336.

*Scientific American*, Sep. 1998, pp. 36 and 40, "The Reinvention of Paper".

N.K. Sheridon and M.A. Berkovitz, "The Gyricon—A Twisting Ball Display", *Proceedings of the S.I.D.*, vol. 18/3 & 4, 1977, pp. 289–293.

Philip Yam, "Plastics Get Wired", *Scientific American*, Jul. 1995, pp. 82–87.

* cited by examiner

Primary Examiner—Thomas Mullen
(74) Attorney, Agent, or Firm—Oliff & Berridge, PLC

(57) ABSTRACT

A method and apparatus for determining the location of an object. An object to be located can be provided with an object locator that includes a display. When the object locator receives a signal indicating that the object associated with the object locator is to be located, the display changes display state to provide a visual indication that the signal has been received. The object locator can be ambient energy-powered, and the display can be a bistable display, such as a rotating element display device.

17 Claims, 7 Drawing Sheets

FIG. 4
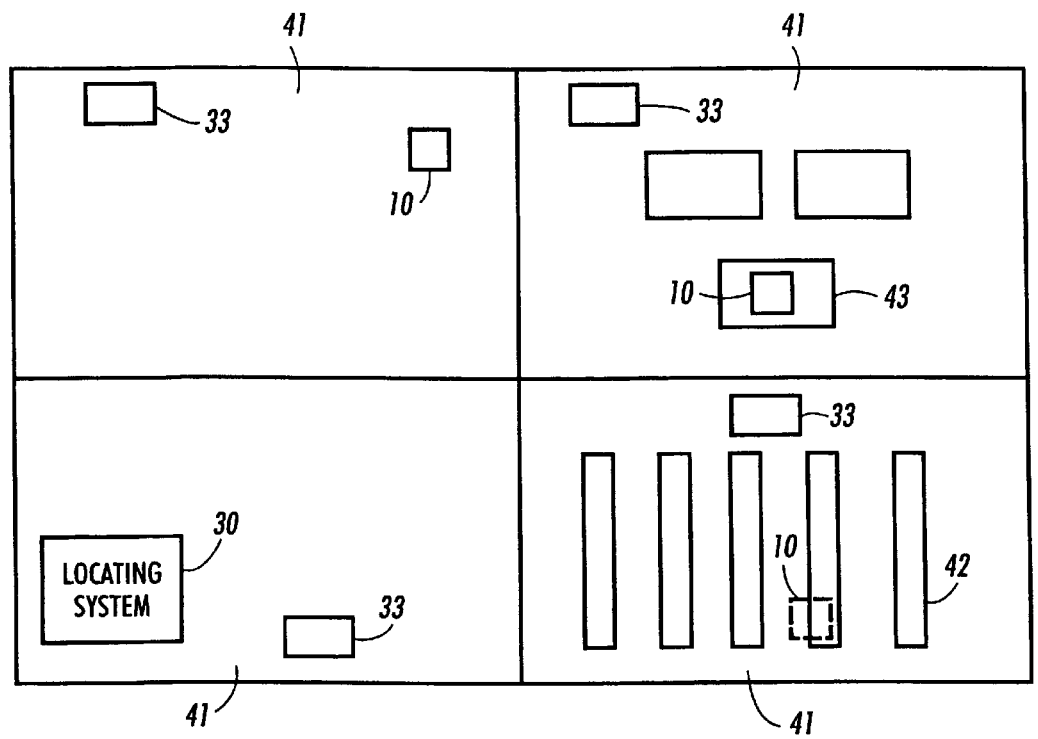
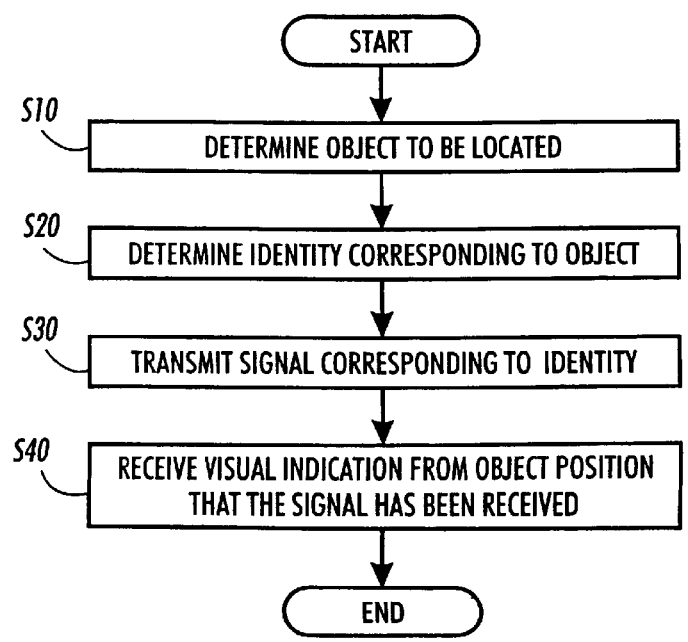
FIG. 5

METHOD AND APPARATUS FOR VISUALLY DETERMINING OBJECT LOCATION

BACKGROUND OF THE INVENTION

1. Field of Invention

This invention relates to addressable displays.

2. Description of Related Art

Systems for locating missing or lost objects are known. For example, lost or stolen vehicles can be located by transmitting an activation signal to a transceiver located in the vehicle that emits a homing signal in response to receiving the activation signal. The transceiver's, and thus vehicle's, location can be determined based on the homing signal emitted by the transceiver. For example, known triangulation techniques can be used to accurately determine the transceiver's location. However, the homing signal emitted by the transceiver does not provide a visual indication of the transceiver's location. Thus, an electronic device is needed to receive and process the homing signal to determine the transceiver's location.

SUMMARY OF THE INVENTION

The invention provides a method for locating an object by determining an object to be located and an identity that corresponds to the object. A signal, which is not necessarily visible, that corresponds to the object's identity is emitted. A visual indication from the object is then received that indicates that the signal has been received. The visual indication can be any effect on ambient and/or reflected radiation, and is not necessarily detectable by the human eye. Instead, the visual indication could be detected by a device, such as an infrared camera and display, which can in turn provide a human-visible indication of the object's location.

In one aspect of the invention, the visual indication is a visual change in an object's appearance.

In one aspect of the invention, a location of the object can be determined based on detecting a change in visual appearance of the object.

In one aspect of the invention, an ambient energy-powered display associated with the object is provided that changes a display state based on the received signal.

In one aspect of the invention, the visual indication from the object that the signal has been received is detectable by the human eye.

The invention also provides an object locator that includes a display, power source, controller and receiver. A receiver detects a signal that corresponds to the object locator and the controller controls the display to change display states in response to the received signal.

In one aspect of the invention, the power source is an ambient energy power source that provides electrical energy to operate the object locator.

In one aspect of the invention, the display is a bistable display.

In one aspect of the invention, the display is a rotating element display.

In one aspect of the invention, the power source is a transformerless power source that includes at least one solar cell.

The invention also provides a position locator system that includes a locating system that determines an identity of an object to be located and transmits a signal corresponding to the determined identity. A plurality of object locators are also provided and when the signal emitted by the position locator corresponds to a given object locator, the object locator display changes display state. Thus, one object in a group of many objects can be visually identified relatively easily.

BRIEF DESCRIPTION OF THE DRAWINGS

The invention will be described in relation to the following drawings in which like reference numerals refer to like elements, and wherein:

FIG. 4 is an exemplary configuration for an object position location system;

FIG. 5 is a flowchart of steps for a method for determining object position;

DETAILED DESCRIPTION

Figure 1:
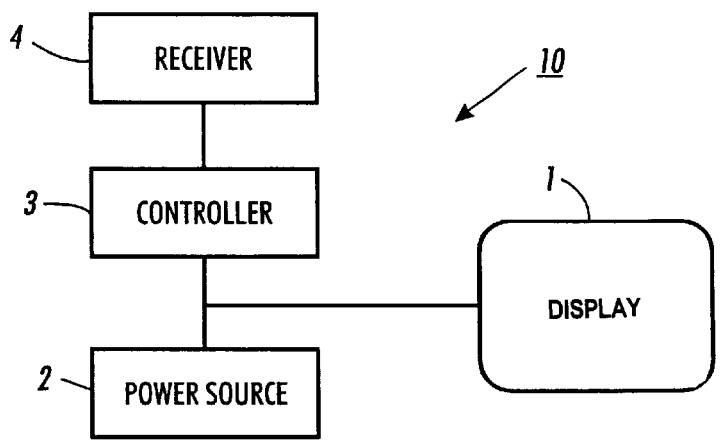
FIG. 1 is a schematic block diagram of a first object locator.

FIG. 1 shows a first object locator 10 in accordance with the invention. The object locator 10 includes a display 1, a power source 2, a controller 3 and a receiver 4. The display 1 can be any type of display, but preferably is a low power, reflective display such as a liquid crystal display (LCD), an electrophoeretic display, a rotating element display, etc. Most preferably, the display 1 is a rotating element, or gyricon, display, such as that disclosed in U.S. Pat. Nos. 4,126,854; 4,143,103; and 5,604,027, which are all incorporated herein by reference in their entirety. Rotating element displays, as well as electrophoeretic displays and some LCDs, are bistable displays. This means that these displays require no power to provide a given display and only require energy to change the display. For example, and as discussed in the patents identified above, a display 1 could include rotating elements, e.g., spheres that have one white hemisphere and one black hemisphere. In addition to being optically anisotropic, the rotating elements are also electrically anisotropic. That is, one portion, e.g., hemisphere, of each rotating element has a higher static electric charge than another portion of the rotating element. Thus, by applying alternating and/or patterned electric fields across a plurality of rotating elements, a desired black/white display can be generated and/or switched. This is one example of a possible display 1. As will be appreciated, various colored displays can be used along with other rotating element shapes, such as cylinders, discs, cubes, etc. The rotating elements can have various optical properties, including multiple different colors, polarization effects, phase retardation effects, light absorption, scattering and reflection effects, etc. In short, any type of rotating element or other bistable display or multistable display now known or developed in the future can be used for the display 1.

The power source 2 can be any power source, such as a battery, a transformer and/or current limiting arrangement that inputs a common household electrical supply, e.g. 100V/60 Hz, and outputs a desired voltage/current, an ambient energy power source, etc. An ambient energy power source 2 can include solar cells or any other appropriate devices that receive ambient energy, e.g., electromagnetic radiation, and produce a desired electrical output. The ambient energy power source 2 can use any type of ambient energy to generate a desired power output. For example, the ambient energy power source 2 could use energy sources such as sound, electric or magnetic fields, temperature variations, humidity, pressure, mechanical vibration or other displacement, or any other energy source that can be collected and converted into a desired output for operating the object locator 10.

The controller 3 receives power from the power source 2 to operate and controls the operation of the display 1. The controller 3 also receives an indication from the receiver 4 that a signal corresponding to the object locator 10 has been received. The controller 3 is preferably an electronic circuit that is designed to provide desired input/output functions in addition to controlling the display 1's operation. The controller 3 can be implemented, at least in part, as a single special purpose integrated circuit, e.g., ASIC or an array of ASICs, each having a main or central processor section for overall, system-level control, and separate sections dedicated to performing various different specific computations, functions and other processes under the control of the central processor section. The controller 3 can also be implemented using a plurality of separate dedicated programmable integrated or other electronic circuits or devices, e.g., hardwired electronic or logic circuits such as discrete element circuits or programmable logic devices. The controller 3 also preferably includes other devices, such as volatile or non-volatile memory devices, communications devices, and/or other circuitry or components necessary to perform the desired input/output or other functions.

As discussed above, the receiver 4 detects a signal that corresponds to the object locator 10. The type or specific components in the receiver 4 vary depending upon the type of signal that the receiver 4 is expected to detect. For example, if the receiver 4 is expected to detect an electromagnetic wave of a specific frequency, the receiver 4 should include at least an appropriate detecting element, e.g., photocell, and other associated devices. The signal detected by the receiver 4 can be any type of signal, including electromagnetic radiation, sound, pressure variations, etc. The receiver 4 can be constructed to detect signals in a broad range, e.g., in a broad frequency range, or be constructed to detect only signals in a very narrow range. Thus, the receiver 4 could function to selectively detect signals specifically intended for receipt by the object locator 10, or the receiver 4 could detect a broad range of signals and allow the controller 3 to analyze detected signals and determine which detected signals, if any, correspond specifically to the object locator 10.

As will be understood, the controller 3 can use any desired techniques to determine if a received signal corresponds to the object locator 10. For example, the detected signal could be modulated to carry information representing an identification number. The controller 3 could decode the identification information from the detected signal and compare the information to identification information stored in the controller 3. If the identification information matches, the controller 3 can determine that the received signal corresponds to the object locator 10 and control the display 1 to change display state. The received signal could be encrypted, if desired, and decrypted by the controller 3. This feature could be useful to ensure that an object locator 10 is not caused to change display state in response to an unauthorized signal.

The object locator 10 described above can be used to locate items, e.g., to locate a box in a warehouse, a book in a library, a car in a parking lot, etc. For example, boxes in a warehouse or mailroom could each be provided with a corresponding object locator 10. Thus, the identity of each box could be corresponded with an object locator 10 that itself has a unique identity with respect to other object locators 10. Thus, if a particular box in the warehouse is to be located, a signal corresponding to the object locator 10 that corresponds to the box is sent, the object locator 10 receives the signal, and the display 1 of the object locator 10 changes its display state to indicate that the signal has been received. The change in display state can be any detectable effect on ambient and/or reflected electromagnetic or other radiation by the display 1. For example, the display 1 could alternate between displaying a white display and a red display at a desired frequency. Of course, any other display indicating that the signal has been received could be used. For example, all object locators 10 in the warehouse could initially display a white display. When a desired object locator 10 is addressed, the display 1 of the address object locator 10 could change to a red or other color display to indicate the object locator 10's presence.

In this example, each object locator 10 in the warehouse has a unique identity. That is, the display 1 of each object locator 10 only changes display state in response to receipt of a specific signal. Thus, in this example, one specific signal would cause only one object locator 10 to change display state and indicate receipt of the signal. Other object locators 10 would not change display state in response to the signal. However, other addressing schemes are possible. For example, the object locators 10 could be coded so that a single signal causes multiple object locators 10 to change display state. This could be useful, for example, when attempting to locate items that have some feature in common. For example, several different and unique packages that are to be delivered to a single address could be provided with object locators 10 so that when a single signal is transmitted, e.g., when a delivery truck arrives at the address for delivery, all object locators 10 associated with packages for delivery at the address change display state.

Figure 2:
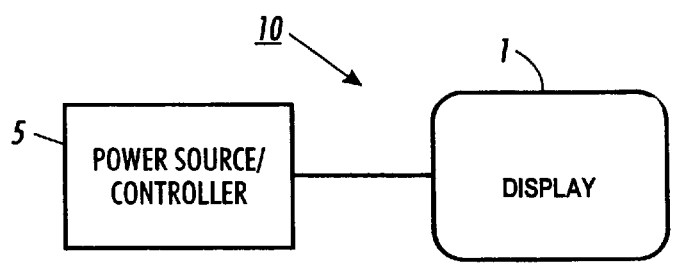
FIG. 2 is a schematic block diagram of a second object locator.

FIG. 2 shows a second object locator in accordance with the invention. In this embodiment, the display 1 can be any display similar to that in the FIG. 1 embodiment. However, the power source 2, the controller 3, and the receiver 4 are all replaced with a single power source/controller 5. In this example, the power source/controller 5 operates to receive a signal that corresponds to the object locator 10. The received signal in this example serves to both trigger and power a change in display state of the display 1. Thus, in this embodiment, the object locator 10 does not require any power supply other than power supplied by the signal used to locate the object locator 10.

Figure 3:
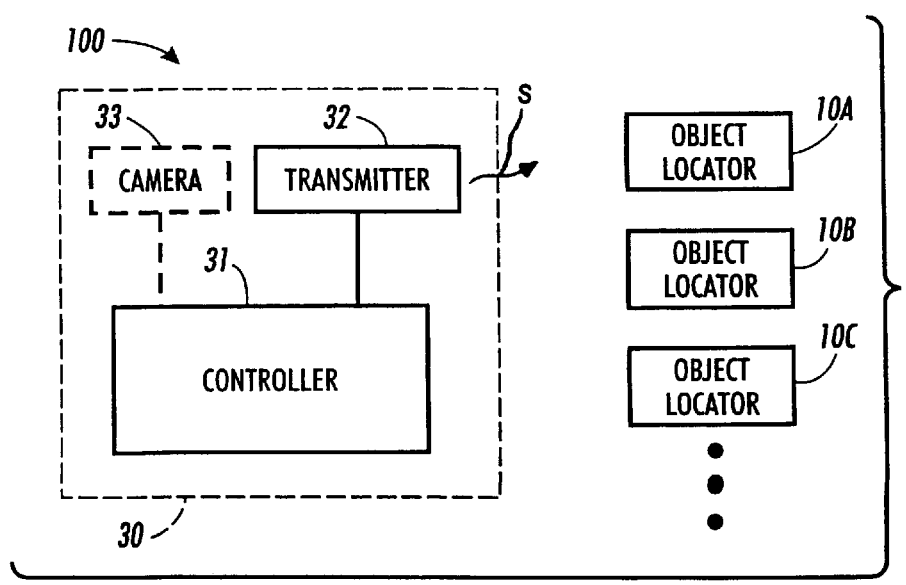
FIG. 3 is a schematic block diagram of an object position location system.

FIG. 3 shows an object position location system 100. A plurality of object locators 10, such as those described in connection with FIGS. 1 or 2, are provided. Preferably, the object locators 10 are associated with a particular object, such as a box, book, vehicle, person, etc, and can be in various locations, such as in different rooms, storage shelves, seats in a theater, etc. A locating system 30 includes a controller 31 and a transmitter 32. The controller 31 is preferably a programmed general purpose computer and includes various components and circuitry, such as a keyboard, monitor display, printer, and/or other input/output devices, to allow a user to selectively designate an object to be located. The controller 31 also preferably includes a memory that stores information regarding the identity of each object locator 10 and information regarding the object, person, etc., associated with each object locator 10. Thus, a user could input a designation for a specific object to be located, and the controller 31 could identify the object and the identity of the object locator 10 associated with the object. Based on the identity of the object locator 10, the controller 31 can also designate a signal S to be transmitted by the transmitter 32 that corresponds to the identity of the object locator 10.

The construction of the transmitter 32 depends upon the type of signal S to be transmitted. For example, a light emitting diode (LED) could be used as part of a transmitter 32 to generate a signal for transmission to a specific object locator 10. However, other transmission devices, e.g., devices that generate other electromagnetic waves, pressure waves, or other detectable disturbances, can be used. For example, a signal could be transmitted that contains information regarding an identification number of a specific object locator 10.

When the transmitter 32 transmits a signal S that corresponds to at least one of the object locators 10, the corresponding object locator 10 receives the signal S and the display 1 of the object locator 10 changes its display state to indicate that the signal has been received. Thus, an object associated with the object locator 10 can be readily identified by recognizing which of the object locators 10 has changed display state. For example, the object locator 10 could decode a received signal and determine that an identification number contained in the signal corresponds to the object locator 10.

The locating system 30 can also include a detecting device 33, such as a video camera, that detects display state changes in object locators 10. Thus, the locating system 30 could determine the location of a desired object based on detecting the presence of an object locator 10 that changes display state in response to a transmitted signal. For example, the detecting device 33 could include multiple video cameras in different rooms of a storage area. When a video camera detects the presence of an object locator 10, the locating system 30 could determine the precise location of the object locator. Various actions could be taken based on the detected location, such as indicating to a user where the desired object is located, e.g., "the object is located in room 4, row 3, bin 42," or use machine vision techniques to guide a robotic picking device to retrieve the desired object.

As one example, FIG. 4 shows a possible configuration for a locating system 30. In this example, a warehouse includes four rooms 41, in which different objects are stored. A locating system 30 is located in a first room 41 and includes at least one camera 33 in each of the rooms 41. Objects (not shown) can be stored in various ways, such as in rows of shelving 42, in crates 43, etc. When a user would like to find a specific object, the locating system 30 sends an appropriate signal S to an object locator 10 associated with the object that changes display state in response to the received signal. At least one camera 33 near the object locator 10 detects the change in display state, and the locating system 30 determines the location of the object locator 10. The locating system 30 can then advise the user that the desired object is in a specific room, shelf, crate, etc. or direct a robotic picking device to retrieve the object. The locating system 30 can also optionally activate additional object locators 10 to guide the robotic picking device or a human to the location of the desired object. For example, object locators 10 could be selectively activated to display directional arrows that, if followed, lead to the desired object.

FIG. 5 shows steps for a method for visually identifying the location of an object. In step S10, an object to be located is determined. For example, one or more items in a warehouse, library, etc., could be determined. The object to be located can be an object associated with an object locator discussed above, or can be the object locator itself.

In step S20, an identity corresponding to the object to be located is determined. Typically, the identity is an identity, e.g., identification number, associated with an object locator that corresponds to the object to be located. For example, if a box in a warehouse is the object to be located, the identity of an object locator that corresponds to the box is determined.

In step S30, a signal corresponding to the identity determined in step S20 is transmitted. That is, a signal that will cause the object locator associated with the object to be located to change display states is transmitted. As discussed above, the signal can be any type of signal, including electromagnetic waves, pressure waves, or any other indication that is detectable. Thus, any known means for transmitting information between two points can be used.

In step S40, a visual indication is received from the object position indicating that the signal transmitted in step S30 has been received. The visual indication can be any desired indication, including a change in display state of a display or any other effect on ambient and/or reflected electromagnetic or other radiation by the object locator. For example, the visual indication could be a detectable change in infrared reflectance by a display. This feature could be useful for locating objects or people at night. The display could be located by detecting ambient infrared light reflected by the display, or by directing an infrared beam toward the display and detecting the reflectance characteristics of the display based on the reflected infrared light. Thus, the visual indication need not be visible to the human eye, but rather can be a detectable change in effect of a device on ambient energy.

By receiving the visual indication, the location of the object can be visually determined. The visual indication can be used in many different ways. For example, a human could visually observe the visual indication and physically retrieve the desired object. The visual indication can also be used to determine an object's location by using a machine vision system. For example, an imaging device such as a video camera could detect the visual indication and an associated image processing device could determine the object's location based on image information provided by the imaging device. This information could be used to direct a robotic retrieval device to retrieve the desired object.

The method shown in FIG. 5 can also include the optional step of providing an ambient energy-powered object locator associated with the object to be located. In particular, the ambient energy-powered object locator can include a bistable display device, such as a rotating element or gyricon display device. Thus, the object can be located by communicating with the object locator associated with the object in a wireless fashion and without providing any additional power, such as by battery or wire, to the object locator. Since the object locator is ambient energy-powered, the object locator could be used for many years without concern for battery depletion or other power supply cut-off.

Figure 6:
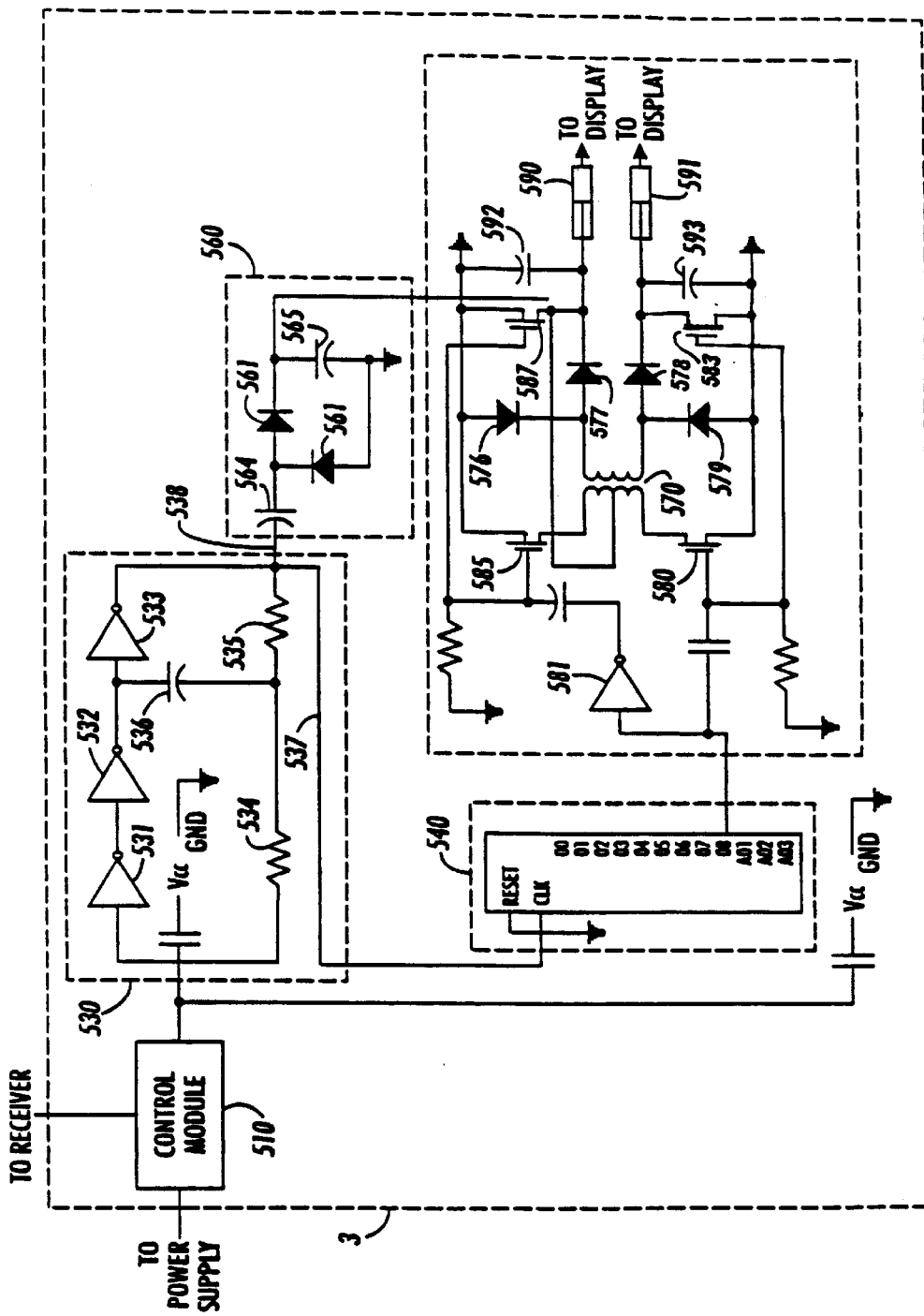
FIG. 6 is a schematic diagram of a first power source and/or controller.

FIG. 6 shows an example controller 3 that can be used in an object locator 10. The controller 3 shown in FIG. 6 is particularly useful when the display 1 in the object locator 10 is a bistable display such as a rotating element or gyricon display.

In the example shown in FIG. 6, a control module 510 communicates with a power supply 2 and a receiver 4. Thus, the control module 510 receives electrical energy from the power supply 2 and information from the receiver 4 regarding a detected signal. However, as discussed in connection with FIG. 2, the power supply 2 could be incorporated into the controller 3 and the receiver 4 eliminated.

When the control module 510 determines that the receiver 4 has detected a signal that corresponds to the object locator 10, the control module 510 provides electrical energy to an oscillator 530 to ultimately cause the display 1 to change display states. The oscillator 530 includes logical inverters 531–533 that are coupled to resistors 534 and 535 and a capacitor 536. In response to the electrical energy supply from the control module 510, the oscillator 530 outputs a substantially square wave signal on a line 537. The square wave signal is input as a clock input to a ripple counter 540. In addition, the oscillator 530 outputs a signal on a line 538 to a voltage doubler 560. The voltage doubler 560 includes diodes 561 and 562 and capacitors 564 and 565. Using the signal provided by the oscillator 530, the voltage doubler 560 produces a voltage approximately twice that supplied from the control module 510 in the capacitor 565.

The ripple counter 540 has a single output that changes state when a specific number of clock pulses are received on the line 537 at the clock input of the ripple counter 540. However, the ripple counter 540 may have a plurality of outputs that each represent a different number of clock pulses that must be received before the output changes state. In this example, the output from the ripple counter 540 is provided to an inverter 581. Thus, when the output of the ripple counter 540 changes from low to high, a transistor 580 is temporarily turned on, allowing charge stored in the capacitor 565 to be discharged through one-half of the primary winding of a transformer 570. The charge pulse provided by the capacitor 565 produces a brief voltage pulse, for example, 110V, with a short duration, such as, for example, one millisecond, across outputs 590 and 591. The outputs 590 and 591 are connected to appropriate electrodes of the display 1 and the voltage pulse present at the outputs 590 and 591 can cause the display 1 to change display state.

The pulse steering bridge formed by the diodes 576–579 allows the short pulse generated by the transformer 570 to charge the capacitor 592. Thus, the display drive signal will remain on the capacitor 592 longer than the duration of the original pulse because the only leakage path is through the reverse-biased diode 577 and the display 1 itself.

To enhance the operation of the display 1, a transistor 583 is pulsed simultaneously with the transistor 580 to remove any charge remaining on the capacitor 593.

When the output of the ripple counter 540 changes from high to low, the signal output from an inverter 581 changes from low to high and a reverse pulse is applied to the primary winding of the transformer 570 through the transistor 585. A transistor 587 is also temporarily turned on to discharge the capacitor 592 and a display drive signal of opposite polarity is provided between the outputs 590 and 591. A capacitor 593 is simultaneously charged to provide a longer duration display drive signal.

Thus, the changing output of the ripple counter 540 causes a change in drive signal polarity provided to the display 1 at the outputs 590 and 591, thereby causing the display 1 to alternate its display state. The rate at which the drive signal changes in polarity depends upon the number of pulses that the ripple counter 540 must receive before changing its output state. Higher numbers of counted pulses before changing output state by the ripple counter 540 produces a lower rate of change in polarity of the display drive signal. Conversely, lower numbers of counted pulses required for the ripple counter 540 to change output state result in a higher frequency of change of the display drive signal.

The controller 3 shown in FIG. 6 is only one example of a possible controller 3 that provides a constantly switching display state of the display 1. However, the controller 3 could be reconfigured to drive the display 1 to change state only once, e.g., from a white display to a red display. In addition, the controller 3 could control the display 1 to change display state at a desired rate, e.g., ten times per second, for a specific time period, e.g., 10 seconds, to indicate that a signal corresponding to the object locator 10 has been received. Similarly, the controller 3 could be configured to control the display 1 to display various information, including alpha-numerical characters, words, desired instructions, desired images, etc. For example, the display 1 could display a part number for the object associated to the object locator 10.

When a rotating particle or other bistable display is used for the display 1 in the object locator 10, the display 1 will maintain a visible display of the desired information even after the controller 3 stops driving the display 1. However, this feature is not necessary and the display 1 could operate so that the display 1 only displays information while being driven by the controller 3.

Figure 7:
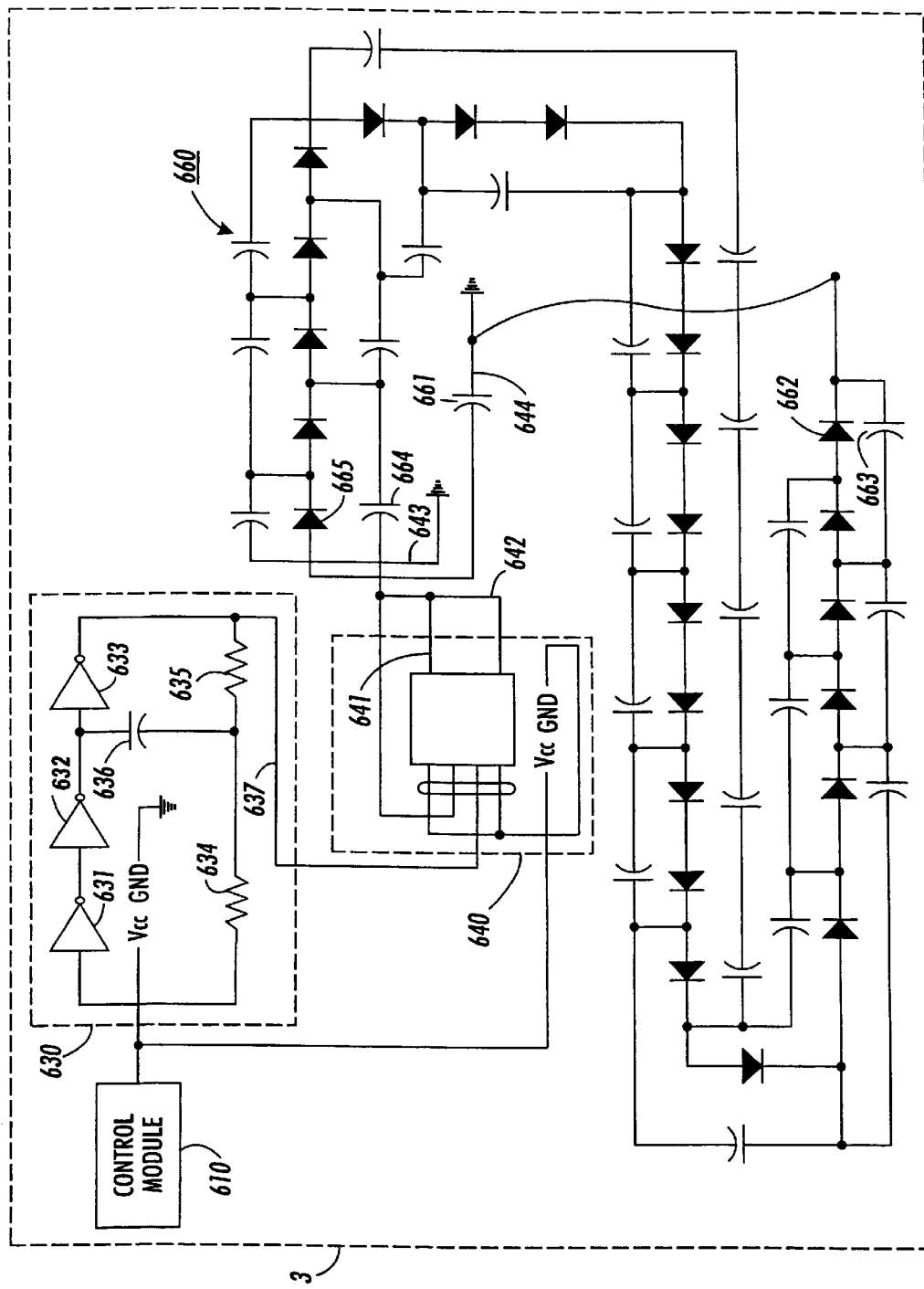
FIG. 7 is a schematic diagram of a second power source and/or controller.

FIG. 7 shows a second controller 3 that can be used in an object locator 10. When the control module 610 determines that a signal corresponding to the object locator 10 has been received, the control module 610 provides electrical energy to an oscillator 630 and a toggle flip-flop clocked device 640. The oscillator 630 operates as discussed above to provide a substantially square wave signal on a line 637 to the toggle flip-flop 640. In response, the toggle flip-flop 640 outputs two substantially square pulse trains on outputs 641 and 642 to a voltage multiplier circuit 660. The voltage multiplier circuit 660 produces a desired voltage across the outputs 643 and 644 of the voltage multiplier 660. The voltage output by the voltage multiplier 660 is provided to one of the drive circuits shown in FIGS. 8, 9 or 10.

Figure 8:
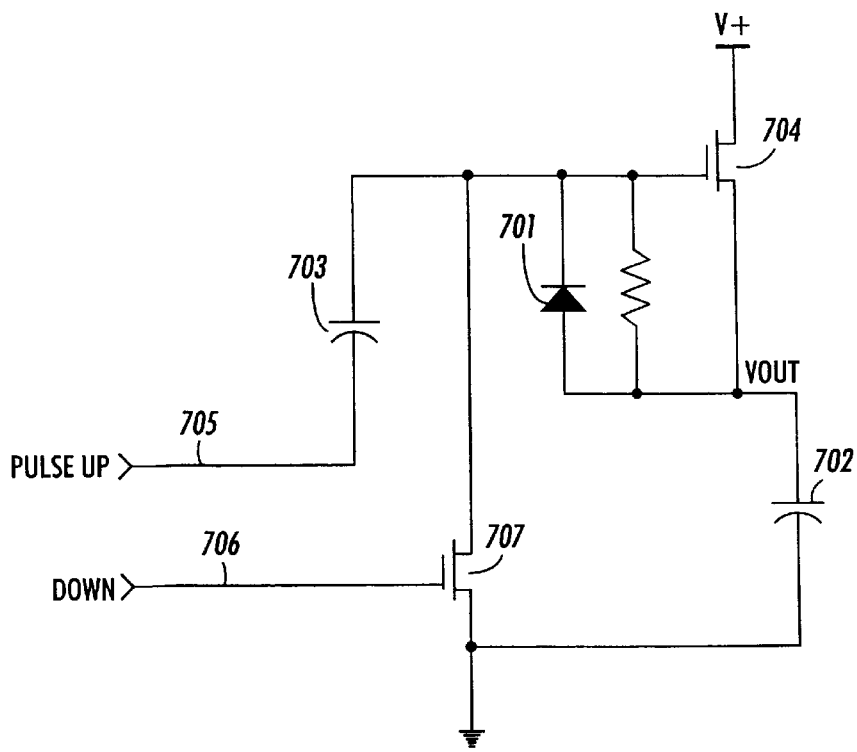
FIG. 8 is a schematic diagram of a first driver circuit for use with the second power source and/or controller of FIG. 7.
Figure 9:
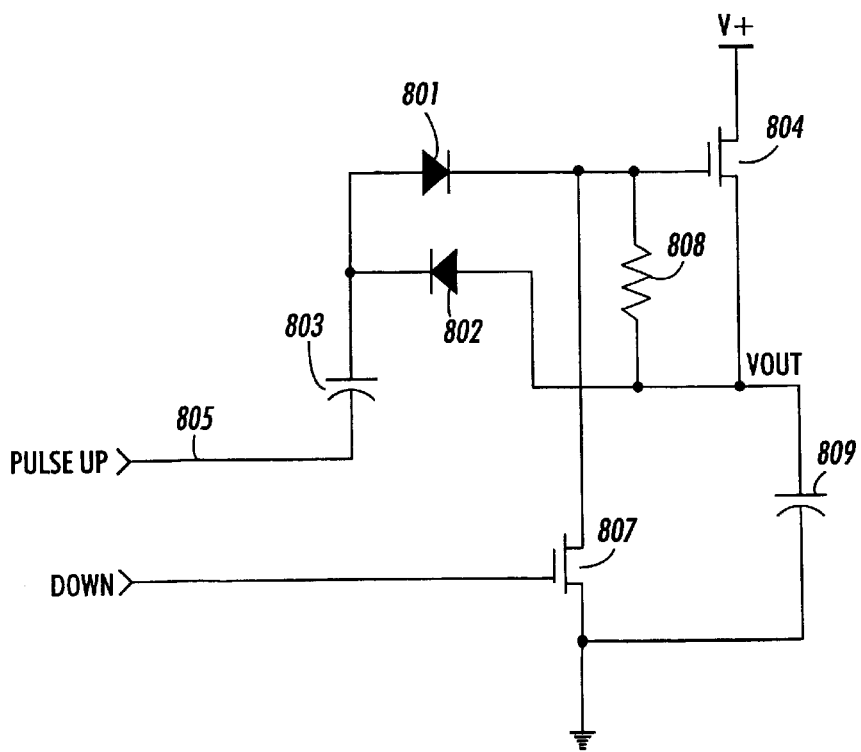
FIG. 9 is a second driver circuit for use with the second power source and/or controller of FIG. 7.

The driver circuits shown in FIGS. 8 and 9 form active charge pumps that can operate using a high voltage supply while consuming very little current. The driver circuit shown in FIG. 8 has a single diode 701. A load capacitor 702 is charged to a high voltage represented by the reference character $V^+$, and is subsequently discharged in response to signals received from a logic circuit (not shown). A capacitor 703 is used as a charge pump capacitor in conjunction with the diode 701 and a transistor 704. A pulse train signal on a line 705 from the logic circuit applies a voltage to one terminal of the charge pump capacitor 703 resulting in the pulse train having a desired voltage amplitude. Since the load capacitor 702 prevents an instantaneous change in voltage at the source of the transistor 704, the gate of the transistor 704 is momentarily raised with respect to its source with each low-to-high change of the voltage pulse train signal on the line 705. When the gate/source voltage exceeds the threshold voltage Vth of the transistor 704, the transistor 704 turns on and delivers a charge to the load capacitor 702. The output voltage Vout then rises until the gate/source voltage drops below the threshold voltage Vth and the transistor 704 turns off. Thus, the load capacitor 702 can be incrementally charged. A single high pulse signal on the line 706 turns on a transistor 707 and discharges the capacitors 702 and 703.

The drive circuit shown in FIG. 9 includes two diodes 801 and 802 in place of a single diode, thereby providing a faster rise time. The diode 801 acts to suppress leakage of the gate capacitance of the transistor 804 so that with the first rising edge of the pulse train signal on a line 805, the transistor 804 turns on and does not turn off until either the load capacitor 809 is completely charged or leakage through the resistor 808 or the diode 801 has caused the gate capacitance to discharge below a threshold level Vth of the transistor 804. The charge pump capacitor 803 is charged through the diode 802 as the load capacitor 809 is charged. The transistor 807 operates similarly to the transistor 707 so that the load capacitor 809 can be discharged without turning on the transistor 804.

Figure 10:
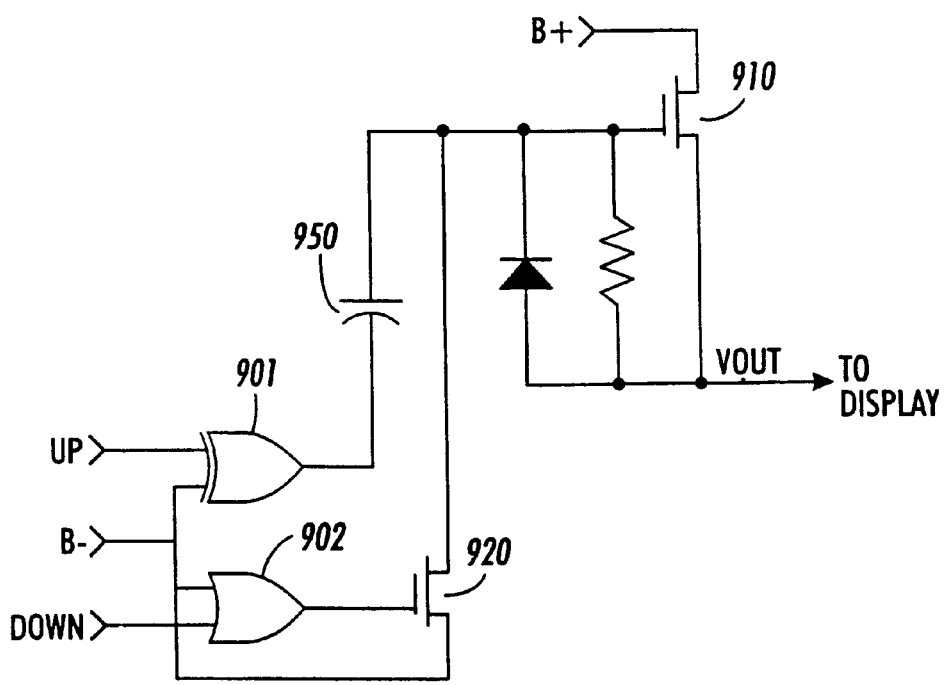
FIG. 10 is a third driver circuit for use with the second power source and/or controller of FIG. 7.

FIG. 10 shows a phase-sensitive logic circuit with the single diode driver circuit shown in FIG. 8. If the output of the OR gate 902 is pulsing in phase with the B-terminal and a logic low is present at the DOWN input, then no drive voltage will be applied to the transistor 920 and the transistor 910 will remain in the off state. Likewise, if the output of the exclusive-OR gate 901 is pulsing in phase with the B- terminal and logic low is present at the UP input, no charge pumping action will occur at the charge pump capacitor 950 and the transistor 910 will remain off. However, if the XOR gate 901 produces a signal that is out of phase with the B- terminal when a logic high is present at the UP input, pulse is applied to the charge pump capacitor 950 which will cause charge pumping action and the transistor 910 will turn on. Thus, the display drive voltage Vout will rise to B+. Likewise, if the DOWN input of the OR gate 902 is high, the transistor 920 will receive a sequence of pulses that cause Vout to drop to B−.

Figure 11:
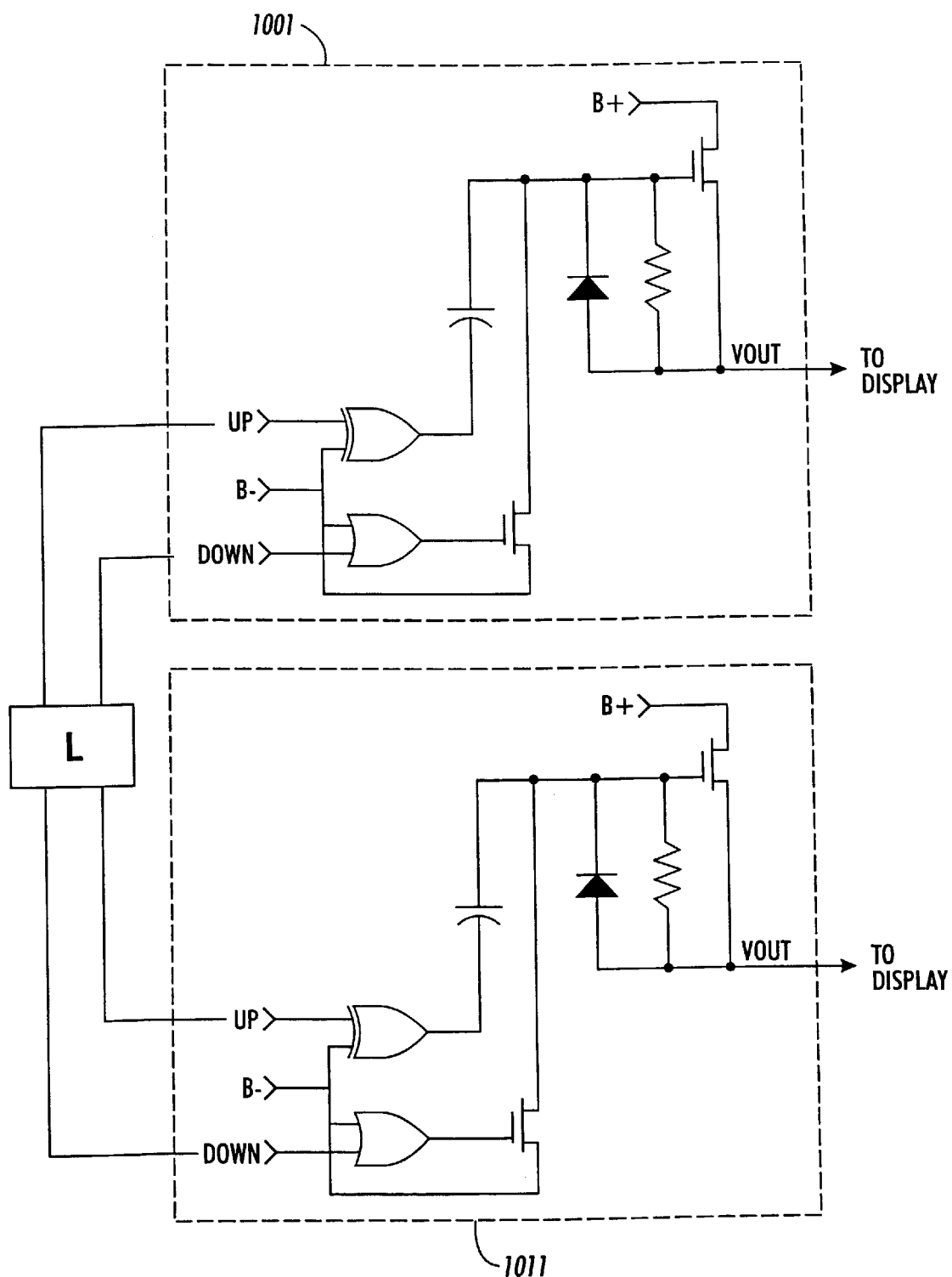
FIG. 11 is a schematic diagram of a series of driver circuits shown in FIG. 10.

FIG. 11 shows a series of phase-sensitive logic circuits. A logic circuit L provides logic signals to the driver circuits 1001 and 1011 so that desired display signals are provided to the display 1. The logic circuit L can be included as part of the control module 610. Although only two phase-sensitive logic circuits 1001 and 1011 are shown in FIG. 11, three or more logic circuits can be used as desired.

While the invention has been described with the specific embodiments, the description of the specific embodiments is illustrative only and is not to be construed as limiting the scope of the invention. Various other modifications and changes may occur to those skilled in the art without departing from the spirit and scope of the invention.

What is claimed is:

1. An object locator comprising:
   a display that can provide at least two different display states;
   a power source that can receive ambient energy and converts the ambient energy to an available supply of power;
   a receiver that can receive a transmitted signal associated with the object locator; and
   a controller that can use the supply of power to cause the display to change display states when the receiver receives a signal that corresponds to the object locator.

2. The object locator of claim 1, wherein the display is a multistable display device.

3. The object locator of claim 1, wherein the display is a rotating element display device.

4. The object locator of claim 1, wherein the power source comprises at least one solar cell that produces electrical energy from ambient electromagnetic radiation.

5. The object locator of claim 1, wherein the display switches display states to provide a visual indication that a signal corresponding to the object locator has been received.

6. The object locator of claim 1, wherein the controller analyzes signals received by the receiver to determine if a received signal corresponds to the object locator.

7. The object locator of claim 1, wherein the receiver only receives signals that correspond to the object locator.

8. An object position locator system comprising:
   a locating system that determines and transmits a signal corresponding to an object to be located; and
   a plurality of object locators, at least one of the object locators capable of receiving the signal transmitted by the locating system, and, in response to the signal, changing a display state of a display in the object locator to provide a visual indication that the signal has been received;
   wherein each of the plurality of object locators comprises:
      a display that changes display state;
      a power source that provides energy to at least drive the display and can convert ambient energy into electrical energy to operate the object locator;
      a receiver that receives a signal from the locating system; and
      a controller that controls the display to change display states to provide a visual indication that a signal corresponding to the object locator has been received.

9. The object position locator system of claim 8, wherein the display is a bistable display.

10. The object position locator system of claim 8, wherein the display is a rotating element display device.

11. The object position locator system of claim 8, wherein the power source comprises at least one solar cell that converts ambient light to electrical energy.

12. A method for locating an object, comprising:
    determining an identity that corresponds to an object to be located;
    providing an ambient energy-powered display associated with the object to be located;
    transmitting a signal that corresponds to the determined identity; and
    receiving a visual indication from a location indicator associated with the object that the transmitted signal has been received, the visual indication providing information regarding the object's location.

13. The method of claim 12, wherein the step of receiving a visual indication comprises:
    detecting a change in visual appearance of a display associated with the object; and
    determining a location of the object based on the detected change in visual appearance.

14. The method of claim 12, further comprising:
    determining a location of the object to be located based on the visual indication; and
    controlling a device to move toward the object to be located based on the determined location.

15. An object position locator system comprising:

a locating system that determines and transmits a signal corresponding to an object to be located; and at least two object locators, associated with different objects, that receive the signal transmitted by the locating system, and, in response to the signal, change a display state of a display in the at least two object locators to provide a visual indication that the signal has been received, with one of the at least two of object locators being in a different display state than other ones of the at least two object locators.

16. The object position locator system of claim 15, wherein the other ones of the at least two object locators are not directly associated with the object to be located, and are changed to a display state that visually points toward the object to be located.

17. The object position locator system of claim 15, wherein the display state of the one of the at least two object locators changes to a first color and the display state of the other ones of the at least two object locators changes to a second color.

* * * * *